United States Patent
Himmelreich et al.

(10) Patent No.: US 9,854,396 B2
(45) Date of Patent: Dec. 26, 2017

(54) MONITORING MOVEMENT TRANSITIONS VIA CELLULAR NETWORK DATA

(71) Applicant: SAP Portals Israel Ltd., Ra'Anana (IL)

(72) Inventors: Evgeny Himmelreich, Lapid (IL); Nirit Cohen-Zur, Raanana (IL); Rachel Ebner, Ra'anana (IL)

(73) Assignee: SAP Portals Israel Ltd., Ra'Anana (IL)

( * ) Notice: Subject to any disclaimer, the term of this patent is extended or adjusted under 35 U.S.C. 154(b) by 18 days.

(21) Appl. No.: 14/949,183

(22) Filed: Nov. 23, 2015

(65) Prior Publication Data

US 2017/0150307 A1    May 25, 2017

(51) Int. Cl.
   H04W 24/00   (2009.01)
   H04W 4/02    (2009.01)
   G08G 1/065   (2006.01)
   G08G 1/14    (2006.01)

(52) U.S. Cl.
   CPC .......... H04W 4/021 (2013.01); G08G 1/065 (2013.01); G08G 1/147 (2013.01); H04W 4/027 (2013.01); H04W 4/028 (2013.01)

(58) Field of Classification Search
   CPC ............. H04W 4/00–4/06; H04W 4/12–4/185
   See application file for complete search history.

(56) References Cited

U.S. PATENT DOCUMENTS

| | | | |
|---|---|---|---|
| 8,665,118 B1* | 3/2014 | Woodard ............... | G08G 1/144 340/425.5 |
| 2001/0018344 A1* | 8/2001 | Tervo ...................... | G01S 5/02 455/435.1 |
| 2007/0004394 A1* | 1/2007 | Chu ....................... | H04W 24/08 455/422.1 |
| 2010/0323715 A1* | 12/2010 | Winters ................ | G01S 5/0027 455/456.1 |
| 2011/0224899 A1* | 9/2011 | Mathews ........... | G01C 21/3685 701/533 |

(Continued)

OTHER PUBLICATIONS

"Anagog: Technology for smarter parking", [Online]. Retrieved from the Internet: <URL: http://anagog.com/about-us/, (Accessed Dec. 14, 2015), 3 pgs.

(Continued)

*Primary Examiner* — San Htun
(74) *Attorney, Agent, or Firm* — Schwegman Lundberg & Woessner, P.A.

(57) ABSTRACT

Systems and methods for receiving cellular network data including a plurality of device identifiers and, for each of the plurality of device identifiers, determining a first cell border crossing associated with a device identifier, determining a second cell border crossing associated with the device identifier, determining a speed of movement of the device associated with the device identifier between the first cell border crossing and the second cell border crossing, determining, based on the speed of movement of the device, that a movement transition for the device associated with the device identifier has occurred between a first movement category and a second movement category, and storing movement data related to the movement transition and associated with a location of the device associated with the device identifier.

20 Claims, 8 Drawing Sheets

(56) References Cited

U.S. PATENT DOCUMENTS

| | | | | |
|---|---|---|---|---|
| 2012/0056758 | A1* | 3/2012 | Kuhlman | G08G 1/14 340/932.2 |
| 2012/0265434 | A1* | 10/2012 | Woodard | G08G 1/147 701/423 |
| 2012/0309410 | A1* | 12/2012 | Marti | H04W 4/028 455/456.1 |
| 2014/0011484 | A1* | 1/2014 | Yen | G08G 1/0133 455/414.1 |
| 2016/0047672 | A1* | 2/2016 | Sachdev | G01C 21/3685 701/438 |

OTHER PUBLICATIONS

"Apple Maps", Wikipedia, [Online]. Retrieved from the Internet: <URL: https://en.wikipedia.org/wiki/Apple_Maps>, (Accessed Dec. 14, 2015), 6 pgs.

"EasyPark", [Online]. Retrieved from the Internet: <URL: https://services.crmservice.eu/raiminisite?Oi%2BcgCbHtFse5vO2IZ2QpjtfBNjS%2FQC3JbpAs9GyzpKgM0qBeNSaQsYZ%2FALrQOwM>, (Accessed Dec. 14, 2015), 3 pgs.

"Here", [Online]. Retrieved from the Internet: <URL: http://360.here.com/2015/12/07/new-world-here;>, (Accessed Dec. 14, 2015), 8 pgs.

"Hi-Park", [Online]. Retrieved from the Internet: <URL: http://www.hi-park.co/our-vision/>, (Accessed Dec. 14, 2015), 2 pgs.

"Inrix", [Online]. Retrieved from the Internet: <URL: http://inrix.com/> (Accessed Dec. 14, 2015), 3 pgs.

"Pango Mobile Parking", [Online]. Retrieved from the Internet: <URL: http://www.parking-net.com/parking-industry/pango-mobile-parking> (Accessed Dec. 14, 2015), 8 pgs.

"Parking Panda", [Online]. Retrieved from the Internet: <URL: https://www.parkingpanda.com/how-it-works>, (Accessed Dec. 14, 2015), 5 pgs.

"Parking Polly", [Online]. Retrieved from the Internet: <URL: http://www.parking-polly.com/en/>, (Accessed Dec. 14, 2015), 3 pgs.

"Parklife", [Online]. Retrieved from the Internet: <URL: https://finder.startupnationcentral.org/c/parklife>, (Accessed Dec. 14, 2015), 4 pgs.

"ParkMe", [Online]. Retrieved from the Internet: <URL: https://www.parkme.com/about>, (Accessed Dec. 14, 2015), 2 pgs.

"Parkmobile: Parking Made Simple", [Online]. Retrieved from the Internet: <URL: http://us.parkmobile.com/>, (Accessed Dec. 14, 2015), 9 pgs.

"ParkNav: Real-Time On-Street Parking in the US and Germany", [Online]. Retrieved from the Internet: <URL: http://parknav.com/#explanationSection >, (Accessed Dec. 14, 2015), 7 pgs.

"Parko", [Online]. Retrieved from the Internet: <URL: http://www.parko.com/>, (Accessed Dec. 14, 2015), 5 pgs.

"Parkopedia", [Online]. Retrieved from the Internet: <URL: http://en.parkopedia.com/about-us/>, (Accessed Dec. 14, 2015), 2 pgs.

"ParksPool", [Online]. Retrieved from the Internet: <URL: https://translate.google.com/translate?hl=en&sl=iw&u=http://www.easypark.co.il%25D7%2593%25D7%25A3-2459-%25D7%2590%25D7%2599%25D7%2596%25D7%2599%25D7%25A4%25D7%2590%25D7%25A8%25D7%25A7-PRIVATE.aspx&prev=search>, (Accessed Dec. 14, 2015), 1 pg.

"ParkWhiz: Guaranteed Parking—Find and Book Parking Anywhere", [Online]. Retrieved from the Internet: <URL: http://www.parkwhiz.com/?gclid=CNWZpsOa3MkCFYVAaQodnEcCQw, (Accessed Dec. 14, 2015), 2 pgs.

"PayByPhone: Pay for car park by phone or via our parking app", [Online]. Retrieved from the Internet: <URL: https://www.paybyphone.com/how-it-works/parking>, (Accessed Dec. 14, 2015), 5 pgs.

"QuickPark—Car Parking at Dublin Airport", [Online], Retrieved from the Internet: <URL: http://quickpark.ie/>, (Accessed Dec. 14, 2015), 3 pgs.

"Streetline: Parker™ by Streetline", [Online]. Retrieved from the Internet: <URL: http://www.streetline.com/find-parking/parker-mobile/>, (Accessed Dec. 14, 2015), 4 pgs.

"TomTom:", [Online]. Retrieved from the Internet: <URL: http://www.tomtom.com/en_us/drive/car/?WT.Click_Link=top_nav_4#carnavigation>, (Accessed Dec. 14, 2015), 13 pgs.

"Waze: Free Community-based Mapping, Traffic & Navigation", [Online]. Retrieved from the Internet: <URL: https://www.waze.com/about>, (Accessed Dec. 14, 2015), 2 pgs.

Janecek, Andreas, et al., "The Cellular Network as a Sensor: From Mobile Phone Data to Real-Time Road Traffic Monitoring", IEEE Transactions on Intelligent Transportation Systems, vol. 16, No. 5, (Oct. 2015), 2551-2572.

* cited by examiner

US 9,854,396 B2

MONITORING MOVEMENT TRANSITIONS VIA CELLULAR NETWORK DATA

TECHNICAL FIELD

The present disclosure relates generally to a mechanism for collecting, calculating, and analyzing movement data.

BRIEF DESCRIPTION OF THE DRAWINGS

Various ones of the appended drawings merely illustrate example embodiments of the present disclosure and should not be considered as limiting its scope.

DETAILED DESCRIPTION

Figure 1:
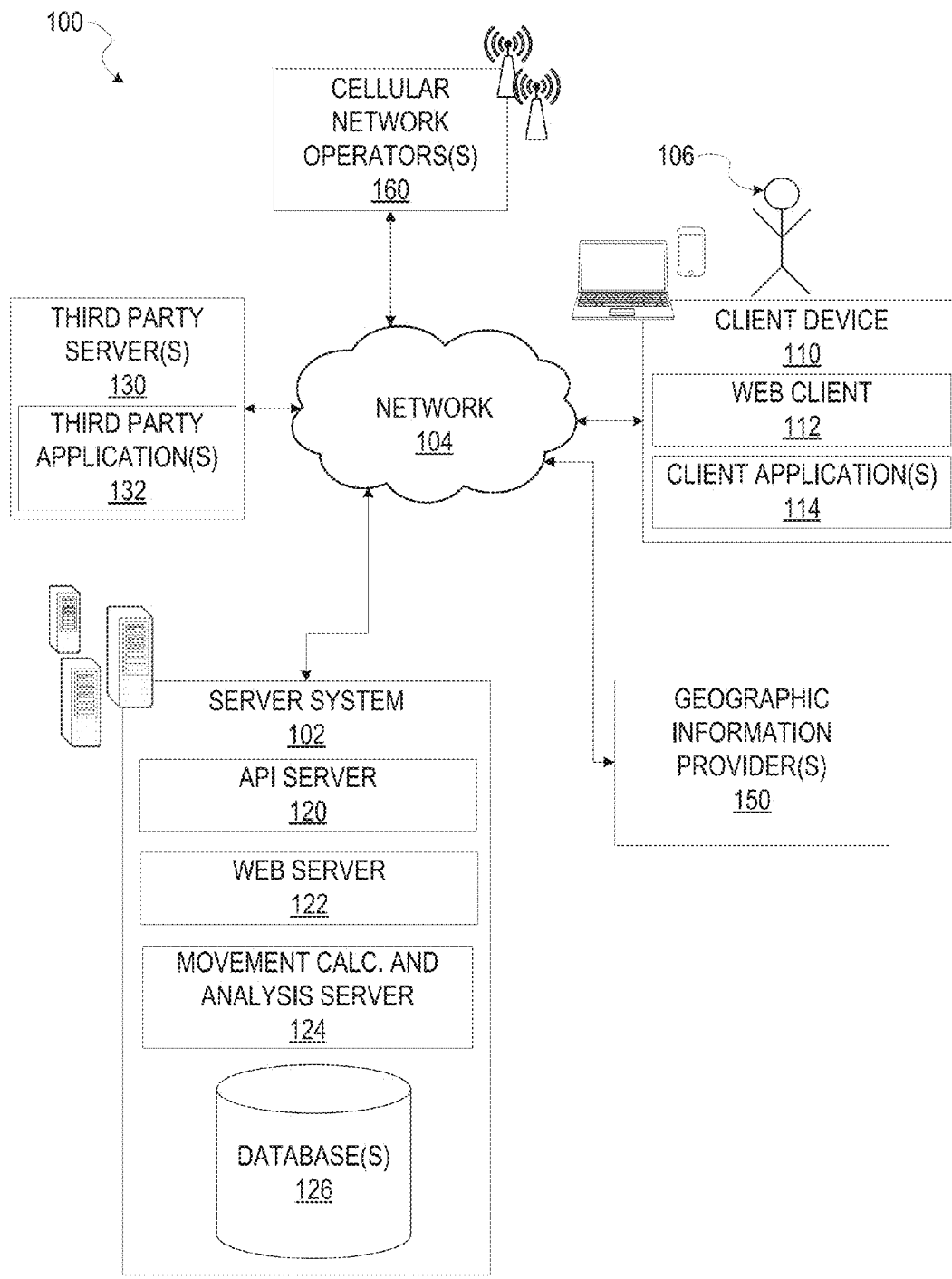
FIG. 1 is a block diagram illustrating a networked system, according to some example embodiments, to collect, calculate, and analyze movement data.

Systems and methods described herein relate to collecting, calculating, and analyzing movement data to determine location of available parking and related information.

Some attempted solutions to the parking problem exist, but suffer from various drawbacks. For example, one solution is to rely on mobile applications installed on users' devices. This solution, however, requires the user to take photos/record videos, manually input data, or allow data to be sent from his device. In addition, this solution requires time to build up enough data to provide useful parking information to users of the solution. Thus, the first day that the system is live it would not contain much valuable real-time information and it requires large enough user base for the ongoing usage. Some solutions address this by providing some basic information about existing parking lots to convince users to install the application and increase the data set.

Another solution is to try a "visual scanning" approach requiring users (e.g., taxi drivers, city vehicles, buses, etc.) to utilize cameras installed on their vehicles to identify empty parking spots by recording traffic as they are driving. With this solution there is a high cost for recruiting, deploying, and maintaining the solution and scaling costs to deploy the solution in a new city would be high.

Another solution is distributing sensors on each parking space to identify free parking spaces. This solution would also be expensive to deploy and maintain. Moreover, such a solution may be applicable for parking garages but may not be applicable for street parking.

Embodiments described herein utilize information from cellular networks to determine location and movement of devices. For example, the system may receive cellular network data for active and idle devices and analyze the data to determine movement speed and patterns for devices. For instance, the system can determine when a particular device crosses between cells in one or more cellular networks and from this determine the speed and direction of movement of the device. From this data the system may determine whether the users of the devices are driving, walking, etc., and may determine when a user transitions from a first movement category, such as walking, to a second movement category, such as driving. The system may further utilize geographical data to determine the location of the users when they transition from a first movement category to a second movement category. For example, the system may determine that the transition from walking to driving occurred at a parking spot and thus, the system may determine that the parking spot is now available (and vice versa to determine the parking spot is occupied).

The system may then store this information to be used for immediate or later calculations and analysis. The system may use this information to provide parking information to users or third parties. For example, the system may analyze this data to provide information to end users of devices about what parking spaces are available in the users' location (or location of interest), the probability of finding parking (e.g., on-street parking) in the users' location (or location of interest), an estimated time to park, the best route to find parking, etc. The system may also, or as an alternative, make various movement data, calculations, and analysis available to third parties so that the third parties may provide the data to users or use the data to do further or related analysis. An API may be provided to the third parties so that the third parties may request and receive movement data and/or parking data from the system.

Example embodiments described herein provide for a number of advantages. For example, embodiments described herein address the problem of having useful data the first day the system is live to ensure that from the first day the service is available, the service is valuable and accurate. Moreover, the system may learn and improve over time to enhance overall prediction accuracy. For example, the system may compare the estimated time to park with actual data to improve overall prediction accuracy. The system may also utilize other data (geographical data, GPS data, user device data, camera data, existing sensor data, etc.) to bolster the system and accuracy of the data. In addition, the system may not be dependent upon when users are available or desire to enter parking data, but can instead be monitoring parking conditions 24/7. Furthermore, in an example embodiment, the system is not dependent upon installing and maintaining physical hardware (e.g., sensors, cameras, etc.). The system may also be able to determine other statistics and trends such as how long users stay in a commercial establishment (e.g., average time a user shops in a grocery store) to determine turnaround time for parking spaces and to use for other commercial needs. Accordingly, embodiments described herein provide for a more accurate and timely system for determining movement data and parking availability and analysis.

FIG. 1 is a block diagram illustrating a networked system 100, according to some example embodiments, configured to collect, calculate, and analyze movement data. The system 100 may include one or more client devices such as client device 110. The client device 110 may comprise, but is not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, computers in vehicles, or any other communication device that a user may utilize to access the networked system 100. In some embodiments, the client device 110 may comprise a display module (not shown) to display information (e.g., in the form of user interfaces). In further embodiments, the client device 110 may comprise one or more of touch screens, accelerometers, gyroscopes, cameras, microphones, global positioning system (GPS) devices, and so forth.

The client device 110 may be a device of a user that is used to search and display location information, maps, parking information, etc. In one embodiment, the system 100 is a parking congestion analysis and optimization system that utilizes cellular network data, among other data, to provide calculations and analysis related to movement data and parking availabilities.

One or more users 106 may be a person, a machine, or other means of interacting with the client device 110. In example embodiments, the user 106 may not be part of the system 100, but may interact with the system 100 via the client device 110 or other means. For instance, the user 106 may provide input (e.g., touch screen input or alphanumeric input) to the client device 110 and the input may be communicated to other entities in the system 100 (e.g., third party servers 130, server system 102, etc.) via the network 104. In this instance, the other entities in the system 100, in response to receiving the input from the user 106, may communicate information to the client device 110 via the network 104 to be presented to the user 106. In this way, the user 106 may interact with the various entities in the system 100 using the client device 110.

The system 100 may further include a network 104. One or more portions of network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks.

The client device 110 may access the various data and applications provided by other entities in the system 100 via web client 112 (e.g., a browser, such as the Internet Explorer® browser developed by Microsoft® Corporation of Redmond, Washington State) or one or more client applications 114. The client device 110 may include one or more applications 114 (also referred to as "apps") such as, but not limited to, a web browser, messaging application, electronic mail (email) application, an e-commerce site application, a mapping or location application, a parking application, and the like. In some embodiments, on or more applications 114 may be included in a given one of the client device 110, and configured to locally provide the user interface and at least some of the functionalities with the application 114 configured to communicate with other entities in the system 100 (e.g., third party servers 130, server system 102, etc.), on an as needed basis, for data and/or processing capabilities not locally available (e.g., access location or parking information, to authenticate a user 106, to verify a method of payment, etc.). Conversely, one or more applications 114 may not be included in the client device 110, and then the client device 110 may use its web browser to access the one or more applications hosted on other entities in the system 100 (e.g., third party servers 130, server system 102, etc.).

A server system 102 may provide server-side functionality via the network 104 (e.g., the Internet or wide area network (WAN)) to one or more third party servers 130 and/or one or more client devices 110.

The server system 102 may include an application program interface (API) server 120, a web server 122, and a movement calculations and analysis server 124, that may be communicatively coupled with one or more databases 126. Databases 126 may be storage devices that store information such as cellular network data, geographical data, movement data, etc.

The movement calculation and analysis server 124 may provide functionality to perform various movement calculations and analysis of cellular network data, geographical data, and client device information (as examples). The movement calculations and analysis server 124 may access one or more databases 126 to retrieve stored data to use in calculations and analysis and to store results of calculations and analysis.

The system 100 may further include one or more third party servers 130. The one or more third party servers 130 may include one or more third party application(s) 132. The one or more third party application(s) 132, executing on third party server(s) 130, may interact with the server system 102 via API server 120 via a programmatic interface provided by the API server 120. For example, one or more the third party applications 132 may request and utilize information from the server system 102 via the API server 120 to support one or more features or functions on a website hosted by the third party or an application hosted by the third party. The third party website or application 132, for example, may provide map, location, or parking information that are supported by relevant functionality and data in the server the system 102.

Figure 6:
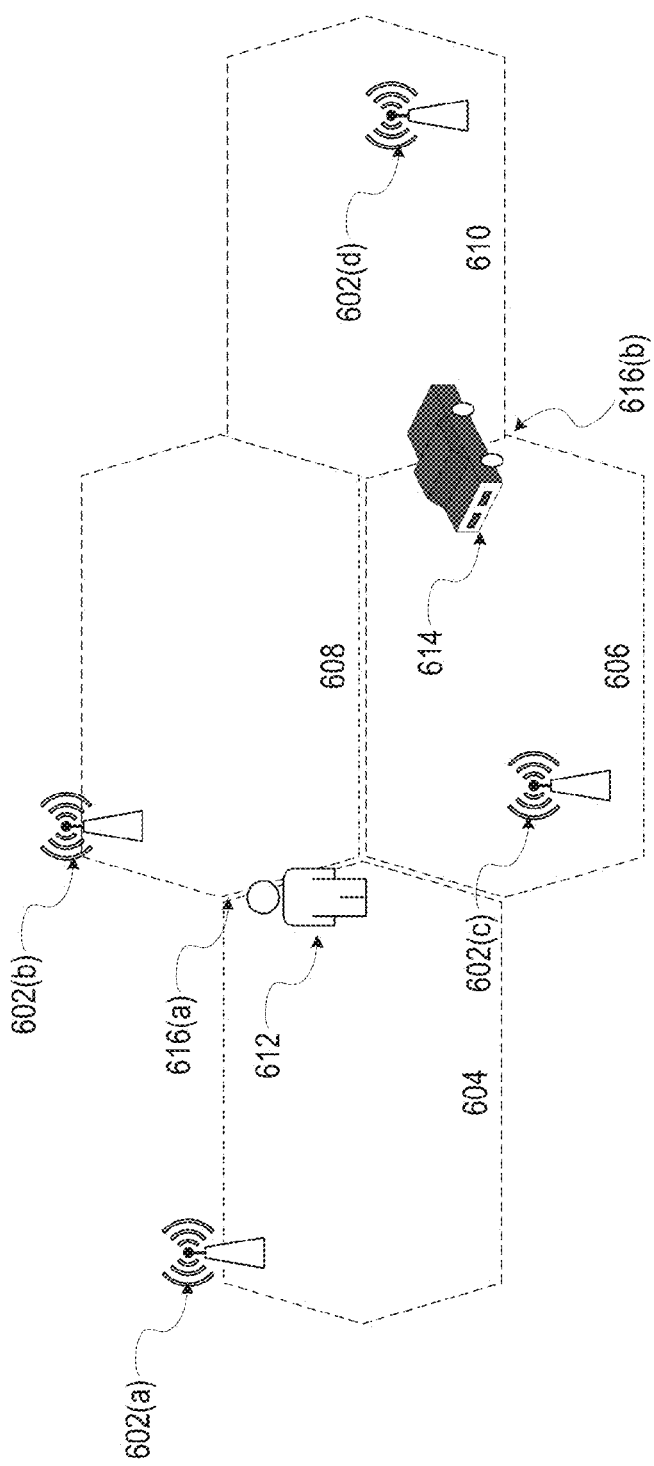
FIG. 6 is a diagram illustrating cells in a cellular network, according to some example embodiments.

The system 100 may further include one or more mobile or cellular network operators 160 that utilize a mobile or cellular network. Mobile or cellular networks comprise land areas called cells. As can be seen in FIG. 6, a cell 604, 606, 608, or 610, may be served by at least one transceiver 602(a)-602(d) (e.g., a cell site or base station). The cells shown in FIG. 6 are uniform in size, however, cells may vary in land area size depending on geographic and active user density (as examples). For example, in a city, a cell site may have a range of up to approximately one quarter or one half mile while, in rural areas, the range could be as much as five miles or more depending on the line-of-sight. When joined, the cells provide coverage over a wide geographic area. One or more devices 110 may be located in various locations in cells 604-610 (e.g., a person 612 carrying a mobile device, a vehicle 614 within which a computer device is installed or with a user 106 carrying a mobile device, etc.) Each cell 604-610 may have a border around the area that it covers and a device may cross between cells 604-610 at borders crossing (e.g., 616(a) and 616(b)). Mobile or cellular network operators 160 may utilize a number of different digital cellular and other technologies such as Global System for Mobile Communications (GSM), General Packet Radio Service (GPRS), cdmaOne, CDMA2000, Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/TDMA), and Integrated Digital Enhanced Network (iDEN), etc. Cellular network operators 160 may include one or more servers and one or more databases for managing and storing cellular network data.

Continuing to refer to FIG. 1, the server system 102 may interact with cellular network operators 160 to request and receive cellular network data via the network 104. For example, the movement calculations and analysis server 124 may request and receive cellular network data including a plurality of device identifiers. The device identifiers may be anonymized for privacy reasons. Other examples of cellular network data requested and received may include one or more cell identifier, geographic coordinates of one or more border crossing (e.g., a plurality of border crossings) between cells in the cellular network, time information for border crossing between cells in the cellular network, a timestamp for the reception of the data, time and location information for where a device associated with a device identifier is located in a cell or when a device associated with a device identifier is crossing a border between cells. The cellular network data may include data from active devices (e.g., devices engaged in calling or messaging) and idle devices. The mobile or cellular network data may be used in substantially real-time to perform calculations and analysis of movement and status of parking spaces and/or may be stored in one or more databases 126 for immediate or later use.

The system 100 further includes one or more geographic information provider(s) 150. Geographic information providers 150 may manage information systems (e.g., geographic information systems (GIS)) for capturing, storing, manipulating, analyzing, managing, and presenting all types of spatial and geographical data. Some examples of geographic information providers 150 include OpenStreetMap, Open Map, Yahoo Maps, Google Maps, particular cities, etc. Geographic information providers 150 may include one or more servers and one or more databases for managing and storing geographic data. Geographic information providers 150 may provide interfaces to other entities (e.g., server system 102, third party servers 130, etc.) so that other entities may request and/or receive geographical data from the geographic information providers 150. For example, the server system 102 may request and/or receive geographical data from a geographic information provider 150 to utilize in calculating and analyzing movement and determining locations for parking. The server system 102 may store information received from geographic information providers 150 in one or more databases 126.

Figure 2:
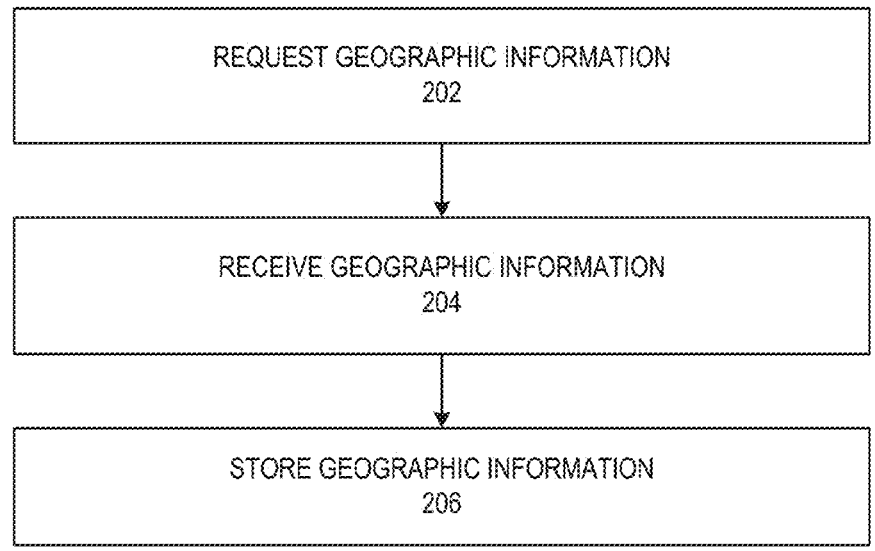
FIG. 2 is a flowchart illustrating aspects of a method, according to some example embodiments for requesting and storing geographic information.

FIG. 2 is a flow chart illustrating aspects of a method 200, according to some example embodiments, for requesting and storing geographic information. For illustrative purposes, method 200 is described with respect to the networked system 100 of FIG. 1. It is to be understood that method 200 may be practiced with other system configurations in other embodiments.

The server system 102 may request geographic information (see operation 202) or geographic data from a geographic information provider 150. For example, the movement calculations and analysis server 124 may request all geographic information of the geographic information provider 150 or may request only specific data in the geographic information. For example, the movement calculations and analysis server 124 may request all data worldwide, all data for a particular area (e.g., country, state, city, city centers, areas where parking is more challenging, etc.), or may request select data worldwide or for a particular area, such as street layouts, driving directions, parking and regulations information, etc.

Next, as shown at operation 204, the movement calculations and analysis server 124 may receive the requested geographic information and then at operation 206 the movement calculations and analysis server 24 may store the geographic information in one or more databases 126. This geographic information may be used by the movement calculations and analysis server 124 for calculating and analyzing movement and determining locations for parking. Optionally, the geographic information may be converted from the format in which it is received into a format for storing in the one or more databases 126.

Figure 3:
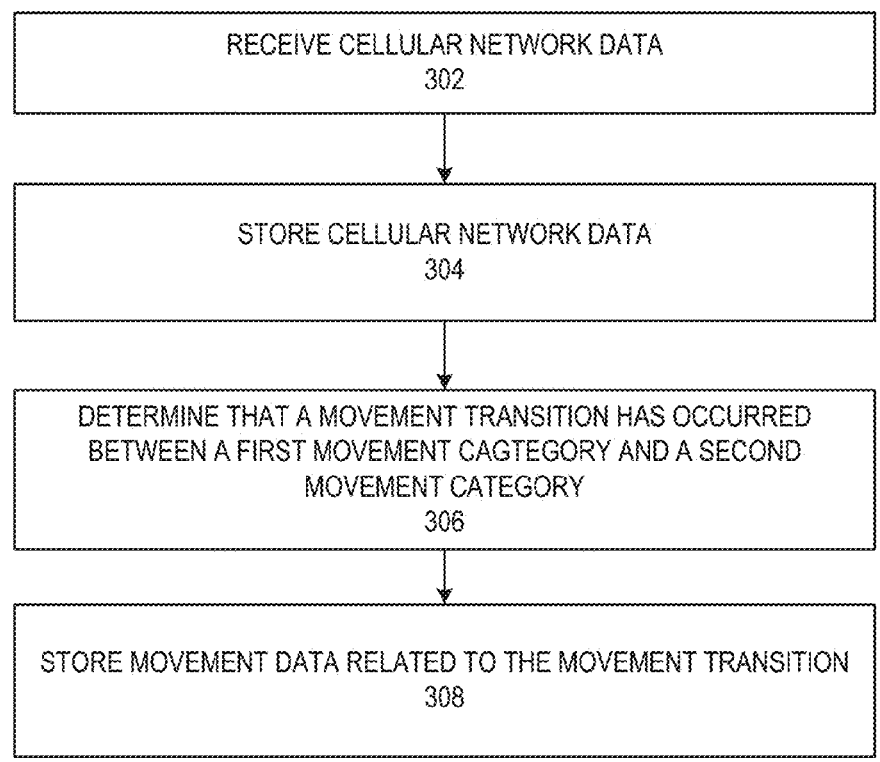
FIG. 3 is a flowchart illustrating aspects of a method, according to some example embodiments, for determining a movement transition.

FIG. 3 is a flow chart illustrating aspects of a method 300, according to some example embodiments, for determining a movement transition. For illustrative purposes, method 300 is described with respect to the networked system 100 of FIG. 1. It is to be understood that method 300 may be practiced with other system configurations in other embodiments.

The server system 102 may request and receive cellular network data from one or more cellular network operators 160. For example, the movement calculations and analysis server 124 may request cellular network data from one or more cellular network operators 160. The movement calculations and analysis server 124 may request all cellular network data available from the one or more cellular network operators 160 or may request a subset of the data available from the one or more cellular network operators 160. The movement calculations and analysis server 124 may request the cellular network data once and from then on have a persistent connection to the cellular network data, or the movement calculations and analysis server 124 may request the data in regular time intervals.

As shown in operation 302, the movement calculations and analysis server 124 may receive the cellular network data. The cellular network data may be stored (see operation 304) in one or more databases 126 for immediate or later use. The movement calculations and analysis server 124 may store all of the cellular network data received or may store a subset of the cellular network data. Optionally, the cellular network data may be converted from the format in which is received into a format for storing in the one or more databases 126. The cellular network data may be received in near real-time from when the data originates or may be sent in short time intervals after the data originates.

The movement calculations and analysis server 124 may utilize the cellular network data received to determine movement data for each of a plurality of device identifiers. The movement data may be determined only from the cellular network data or may be determined using the cellular network data (all or a subset) and other data such as geographical data or data from other sources.

One example of movement data may be a movement speed and/or direction for a device associated with a device identifier. In one example, a device movement speed and/or direction may be determined by using information of when a device associated with a device identifier crosses from one border of a cell to another cell. For example, the movement calculations and analysis server 124 may determine a first cell border crossing associated with a device identifier of a plurality of device identifiers, determine a second cell border crossing associated with the device identifier, and then determine the speed of movement of a device associated with the device identifier between the first cell border crossing and the second cell border crossing. For instance, the movement calculations and analysis server 124 may utilize time information for each border crossing from the cellular network data and determine the speed of movement based on the time it took the device to travel from the first cell border crossing to the second cell border crossing. The movement calculations and analysis server 124 may also determine a direction of movement based on the first cell border crossing and the second cell border crossing (e.g., using time and location information of border crossings).

The location of the first cell border crossing and the second cell border crossing may be determined from the cellular network data. For example, the cellular network data may include an indication of the cell border crossing (e.g., the geographical coordinates of the cell border crossing, time of the cell border crossing, etc.) or the cellular network data may include a cell identifier and the movement calculations and analysis server 124 may determine the location of the cell and respective borders based on the cell identifier and other data with geographical coordinates of cells (e.g., by looking up location data for the cell identifier from other data sources).

Another example of movement data is a movement transition for a device associated with a device identifier. As shown in operation 306, server 125 may determine that a movement transition has occurred between a first movement category and a second movement category. A movement category may include various forms of movement such as driving, walking, sitting, standing, biking, running, etc. In one example, the movement calculations and analysis server 124 may use the speed of movement of the device (as described above) to determine whether a movement transition has occurred. For instance, the movement calculations and analysis server 124 may determine that a user of the device has switched from driving to walking or vice versa based on the speed of movement changing from a driving speed to a walking speed or vice versa. The movement calculations and analysis server 124 may store this movement transition as movement data (see operation 308) in one or more databases 126.

The movement calculations and analysis server 124 may also determine a location of device when the movement transition occurred. This may be determined using cellular network data, geographical data, or other data. The location of the device may be associated with the movement transition and stored as movement data. The movement calculations and analysis server 124 may also determine whether the location of the device when the movement transition occurred is associated with a parking space, and thus, determine whether a parking space is vacant or occupied. This analysis and data may also be stored in one or more databases 126. For example, the movement calculations and analysis server 124 may analyze geographical data and parking regulation data to determine whether the device location when the movement transition occurred is associated with a parking spot.

Determining that a movement transition occurred may also be based on movement data for other devices associated with the plurality of device identifiers. For example, the movement calculations and analysis server 124 may determine that a device has stopped moving or slowed down significantly (e.g., to a walking speed). Before changing the movement category from driving to walking (for example) for a device, the movement calculations and analysis server 124 may check other data for other devices in a similar location as the device (e.g., from data stored in the one or more databases 126) to determine whether those devices have also stopped or significantly slowed. The movement calculations and analysis server 124 may also use geographical data to determine whether the device or other devices are on a highway, road, parking lot, parking area, etc. Using this information, the movement calculations and analysis server 124 may determine whether the device has truly changed from driving to walking, or if the device is just in a car stuck in a traffic jam (for example) near a parking spot. The movement calculations and analysis server 124 may determine the movement category for the device accordingly.

All of the data calculated, analyzed, and stored by the server system 102 may be accessed by third parties such as third party servers 130. The server system 102 may include an API server 120 that allows a third party server 130 to interface with the server system 102 and request various data, calculations, and analysis from the server system 102.

Figure 4:
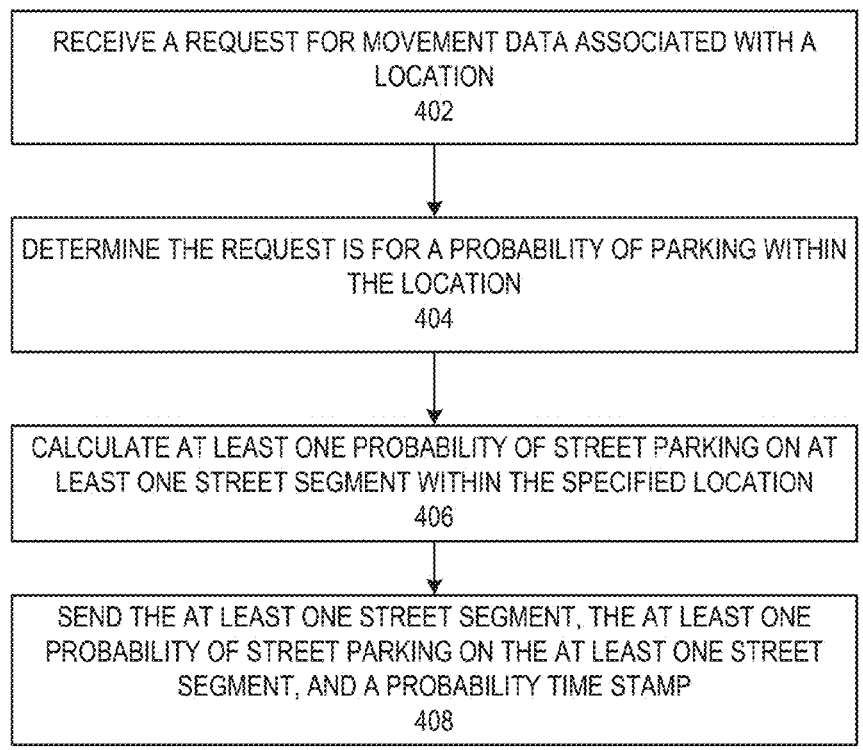
FIG. 4 is a flowchart illustrating aspects of a method, according to some example embodiments, for determining a probability of parking.

FIG. 4 is a flow chart illustrating aspects of a method 400 according to some example embodiments, for determining a probability of parking. For illustrative purposes, method 400 is described with respect to the networked system 100 of FIG. 1. It is to be understood that method 400 may be practiced with other system configurations in other embodiments.

The server system 102 may receive a request for movement data from one or more third party servers 130. For example, a third party server 130 may request information for movement data via API server 120. The third party server 130 may have one or more third party applications 132 for which it needs to utilize movement data.

In one example, the third party application 132 may be a map application for providing map and location information, driving directions, and parking information to a user 106. The third party server 130 may send a request for movement data for a particular location to the server system 102 via API server 120. For example, the user 106 that is using the map application may be driving in a particular location and need parking. In the request for movement data the third party server 130 may include location information for the area for which it needs movement data. For instance, the third party server 130 could provide a polygon that defines the map area of interest, particular coordinates, a city name, event name, venue name, etc.

API server 120 may receive the request and communicate the request to movement calculations and analysis server 124 (or handle the request directly). As shown in operation 402, the movement calculations and analysis server 124 may receive the request for movement data associated with a location and determine how to respond to the request. For example, the movement calculations and analysis server 124 may determine that the request is for a probability of parking within/near the location (see operation 404). The request may be for a heat map of probability to find a parking spot, such as an "on-street" parking spot, on a particular street or street segment. The movement calculations and analysis server 124 may calculate at least one probability of street parking on at least one street segment within/near the specified location (see operation 406) and then send the at least one probability of street parking on the at least one street segment and a probability time stamp (see operation 408) to the third party server 130. The movement calculations and analysis server 124 may calculate more than one probability of street parking on the at least one street segment within/near the specified location (e.g., one probability for each side of the street). The movement calculations and analysis server 124 may also take into consideration other factors such as the direction of the street, municipal parking regulations, etc. For example some street parking may be allowed for the public during the day and only for residents during the evening and night. The third party server 130 may continue to request this data in short time intervals and/or the movement calculations and analysis server 124 may continue to send the data in short time intervals. The third party server 130 may stop requesting the data and/or the movement calculations and analysis server 124 may stop sending the data once it has determined that the user 106 has parked.

Figure 5:
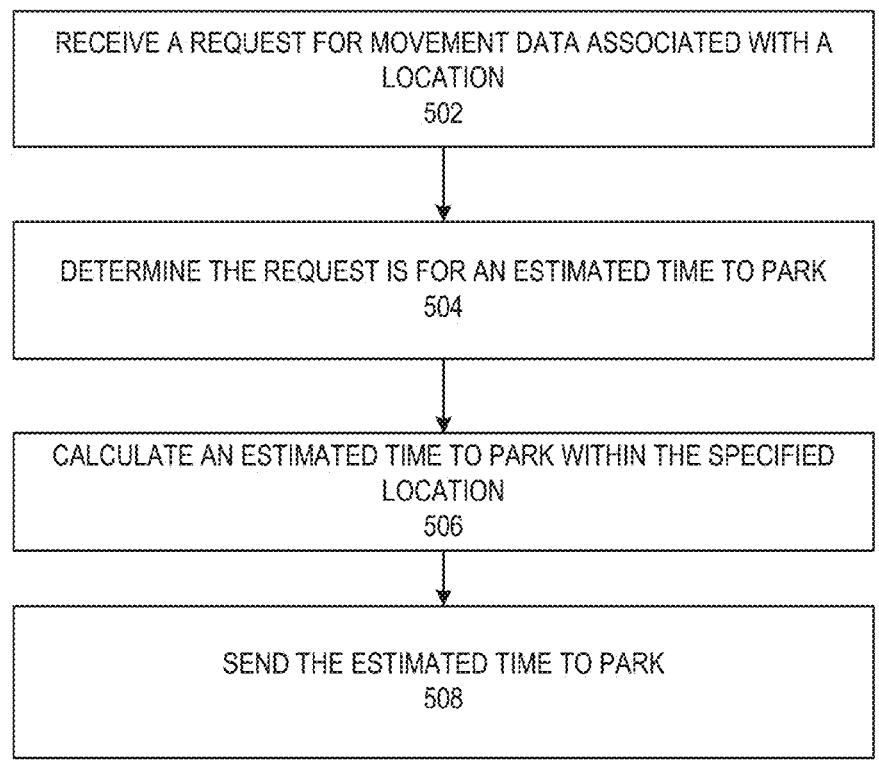
FIG. 5 is a flowchart illustrating aspects of a method, according to some example embodiments, for determining an estimated time to park.

FIG. 5 is a flow chart illustrating aspects of method 500 according to some example embodiments, for determining an estimated time to park. For illustrative purposes, method 500 is described with respect to the networked system 100 of FIG. 1. It is to be understood that method 500 may be practiced with other system configurations in other embodiments. As shown in operation 502, the movement calculations and analysis server 124 may receive a request for movement data associated with a location, as described above, and determine that the request for movement data is for an estimated time to park (see operation 504).

As shown in operation 506, the movement calculations and analysis server 124 may calculate the estimated time to park within/near the specified location. For example, the movement calculations and analysis server 124 may determine the estimated time to park based on movement data (e.g., how many open parking spaces, how many cars leaving parking spaces, how many cars arriving at parking spaces, number of occupied parking spaces, time of day, etc.) for parking spots (e.g., street parking spots, garage parking spots, etc.). From the movement data, the movement calculations and analysis server 124 may determine the estimated time (e.g., seconds, minutes, etc.) a user 106 would have to drive around before finding a parking spot. The movement calculations and analysis server 124 may also determine an estimated average time to walk from the user 106's car to the destination. The movement calculations and analysis server 124 may then send the estimated time to park (e.g., estimated time in minutes to find a parking spot, estimated time in minutes to find a parking spot and average time to walk to destination, etc.) to the third party servers 130 (see operation 508).

In yet another example, the movement calculations and analysis server 124 may receive a request for movement data associated with a location as described above and determine that the request is for a best route to find parking. For example, the movement calculations and analysis server 124 may send a route (e.g., with way-points) to find a parking location with the location provided (e.g., within a radius of the point of interest). In the alternative, the movement calculations and analysis server 124 may send data to the third party server 130 and the third party server 130 may use the data to calculate a best route to find parking.

The server system 102 may provide additional services to other entities such as third party servers 130 or client devices 110. For example, the server system 102 may provide tools and capabilities to collect and analyze data (e.g., extract, transform, load) and bind the data with street segments (e.g., map data). This may be done in batch or real-time. For example, the server system 102 may send batch data that may include one or more of the following: historical parking data, parking regulations data, event schedule data (e.g., big event in the desired location), mobile device trace data, meter payment data, open source(s) data sets, off-street parking location availability/occupancy, traffic light sequences, etc. In another example, the server system 102 may send real-time data that may include one or more of the following: weather data, parking sensor data (e.g., from street sensors or device sensors (including mobile applications), etc.). The server system 102 may provide users 106 (e.g., parking data analysts, client device users, etc.) tools and capabilities to review the data in the server system 102 and improve the data and services provided by the server system 102. The server system 102 may provide incentives to incentivize users 106 of the service to share data such that the system and algorithms may improve with more and more data.

In addition to utilizing cellular network data, the server system 102 could utilize other information to provide more in-depth information about parking availability. For example, the system 100 could utilize information from providers of Global Positioning System (GPS) data, information collected from device users 106, information from parking sensors, etc. The server system 102 may use information from any source to learn and enhance parking data and analysis.

Figure 7:
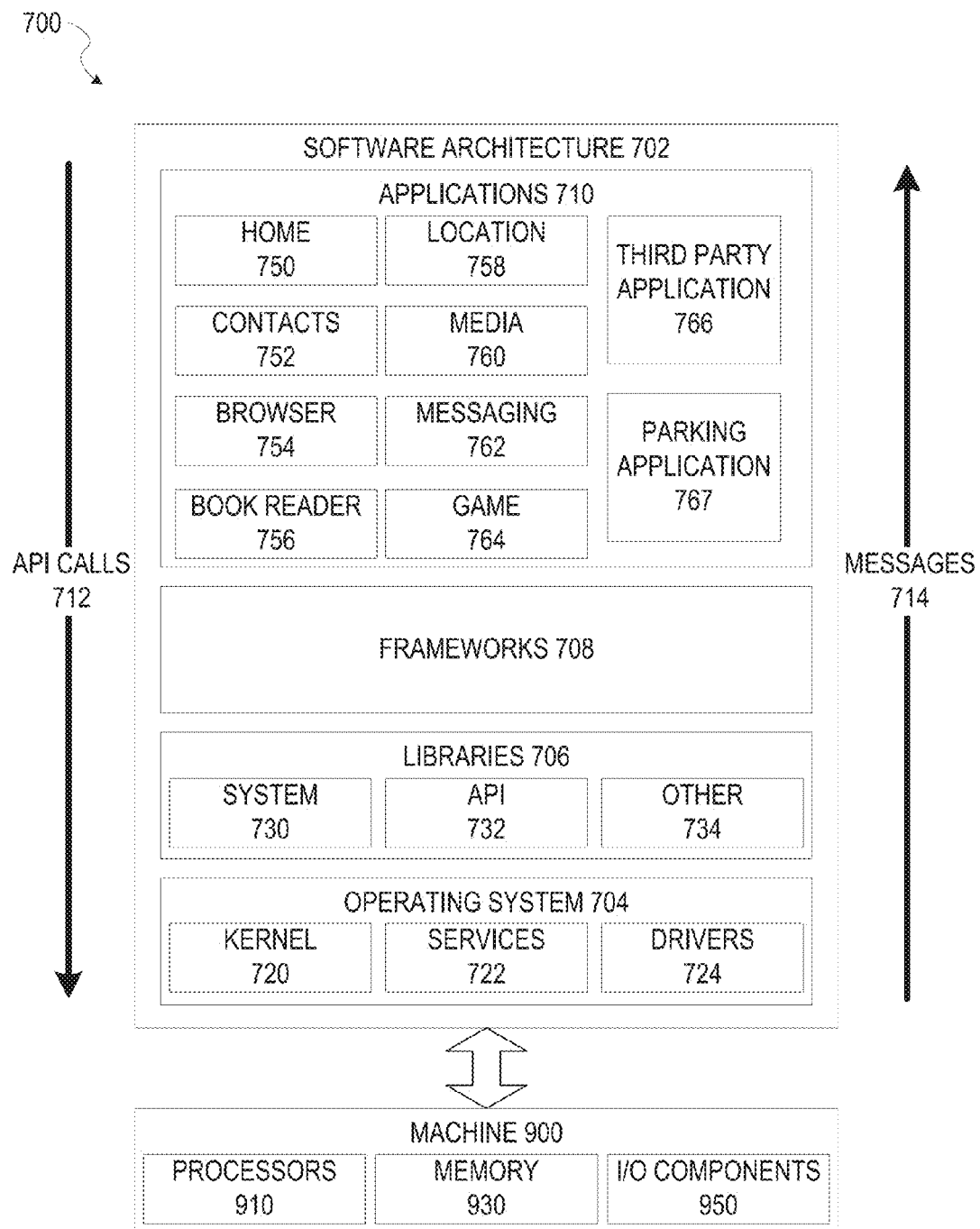
FIG. 7 is a block diagram illustrating an example of a software architecture that may be installed on a machine, according to some example embodiments, configured to collect, calculate, and analyze movement data.

FIG. 7 is a block diagram 700 illustrating an architecture of software 702, which can be installed on any one or more of the devices described above. For example, in various embodiments, client devices 110 and server systems 130, 102, 122, and 124 may be implemented using some or all of the elements of software architecture 702. FIG. 7 is merely a non-limiting example of a software architecture, and it will be appreciated that many other architectures can be implemented to facilitate the functionality described herein. In various embodiments, the software architecture 702 is implemented by hardware such as machine 900 of FIG. 8 that includes processors 910, memory 930, and I/O components 950. In this example, the software architecture 702 can be conceptualized as a stack of layers where each layer may provide a particular functionality. For example, the software architecture 702 includes layers such as an operating system 704, libraries 706, frameworks 708, and applications 710. Operationally, the applications 710 invoke application programming interface (API) calls 712 through the software stack and receive messages 714 in response to the API calls 712, consistent with some embodiments.

In various implementations, the operating system 704 manages hardware resources and provides common services. The operating system 704 includes, for example, a kernel 720, services 722, and drivers 724. The kernel 720 acts as an abstraction layer between the hardware and the other software layers, consistent with some embodiments. For example, the kernel 720 provides memory management, processor management (e.g., scheduling), component management, networking, and security settings, among other functionality. The services 722 can provide other common services for the other software layers. The drivers 724 are responsible for controlling or interfacing with the underlying hardware, according to some embodiments. For instance, the drivers 724 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

In some embodiments, the libraries 706 provide a low-level common infrastructure utilized by the applications 710. The libraries 706 can include system libraries 730 (e.g., C standard library) that can provide functions such as memory allocation functions, string manipulation functions, mathematic functions, and the like. In addition, the libraries 706 can include API libraries 732 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in graphic content on a display), database libraries (e.g., SQLite to provide various relational database functions), web libraries (e.g., WebKit to provide web browsing functionality), and the like. The libraries 706 can also include a wide variety of other libraries 734 to provide many other APIs to the applications 710.

The frameworks 708 provide a high-level common infrastructure that can be utilized by the applications 710, according to some embodiments. For example, the frameworks 708 provide various graphic user interface (GUI) functions, high-level resource management, high-level location services, and so forth. The frameworks 708 can provide a broad spectrum of other APIs that can be utilized by the applications 710, some of which may be specific to a particular operating system 704 or platform.

In an example embodiment, the applications 710 include a home application 750, a contacts application 752, a browser application 754, a book reader application 756, a location application 758, a media application 760, a messaging application 762, a game application 764, and a broad assortment of other applications such as a third party applications 766. According to some embodiments, the applications 710 are programs that execute functions defined in the programs. Various programming languages can be employed to create one or more of the applications 710, structured in a variety of manners, such as object-oriented programming languages (e.g., Objective-C, Java, or C++) or procedural programming languages (e.g., C or assembly language). In a specific example, the third party application 766 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third party application 766 can invoke the API calls 712 provided by the operating system 704 to facilitate functionality described herein.

Some embodiments may particularly include a parking application 767. In certain embodiments, this may be a stand-alone application that operates to manage communications with a server system such as third party servers 130 or server system 102. In other embodiments, this functionality may be integrated with another application such as a location application or another such application. Parking application 767 may request and display various types of parking information (e.g., available parking, estimated time to park, etc.) and may provide the capability for a user to input data related to parking via a touch interface, keyboard, or using a camera device of machine 900, communication with a server system via I/O components 950, and receipt and storage of parking data in memory 930. Presentation of parking information and user inputs associated with parking information may be managed by parking application 767 using different frameworks 708, library 706 elements, or operating system 704 elements operating on a machine 900.

Figure 8:
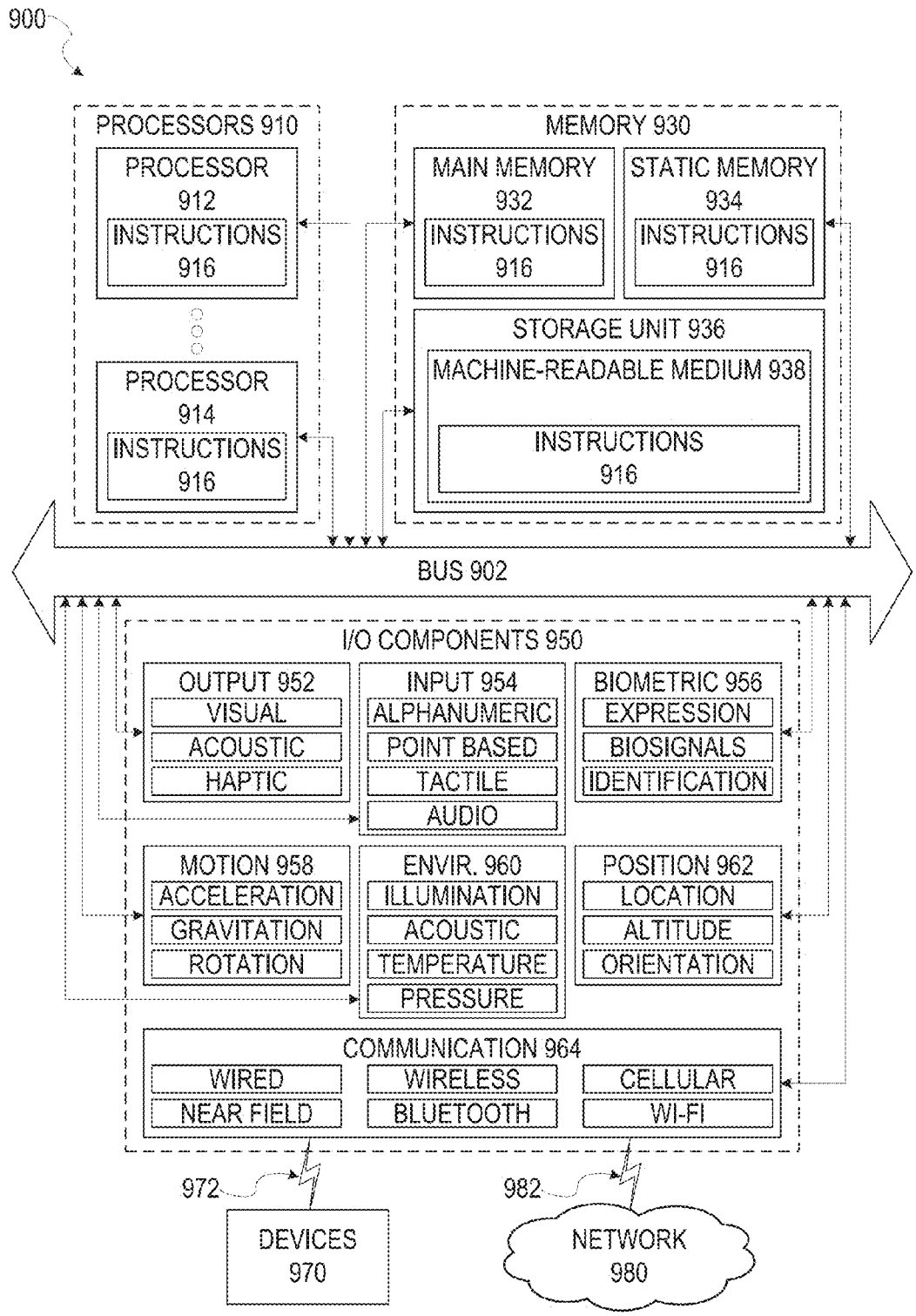
FIG. 8 illustrates a diagrammatic representation of a machine, in the form of a computer system, within which a set of instructions may be executed for causing the machine to perform any one or more of the methodologies discussed herein, according to an example embodiment.

FIG. 8 is a block diagram illustrating components of a machine 900, according to some embodiments, able to read instructions from a machine-readable medium (e.g., a machine-readable storage medium) and perform any one or more of the methodologies discussed herein. Specifically, FIG. 8 shows a diagrammatic representation of the machine 900 in the example form of a computer system, within which instructions 916 (e.g., software, a program, an application 710, an applet, an app, or other executable code) for causing the machine 900 to perform any one or more of the methodologies discussed herein can be executed. In alternative embodiments, the machine 900 operates as a standalone device or can be coupled (e.g., networked) to other machines. In a networked deployment, the machine 900 may operate in the capacity of a server machine 130, 102, 120, 122, 124, etc. or a client device 110 in a server-client network environment, or as a peer machine in a peer-to-peer (or distributed) network environment. The machine 900 can comprise, but not be limited to, a server computer, a client computer, a personal computer (PC), a tablet computer, a laptop computer, a netbook, a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 916, sequentially or otherwise, that specify actions to be taken by the machine 900. Further, while only a single machine 900 is illustrated, the term "machine" shall also be taken to include a collection of machines 900 that individually or jointly execute the instructions 916 to perform any one or more of the methodologies discussed herein.

In various embodiments, the machine 900 comprises processors 910, memory 930, and I/O components 950, which can be configured to communicate with each other via a bus 902. In an example embodiment, the processors 910 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) include, for example, a processor 912 and a processor 914 that may execute the instructions 916. The term "processor" is intended to include multi-core processors 910 that may comprise two or more independent processors 912, 914 (also referred to as "cores") that can execute instructions 916 contemporaneously. Although FIG. 9 shows multiple processors 910, the machine 900 may include a single processor 910 with a single core, a single processor 910 with multiple cores (e.g., a multi-core processor 910), multiple processors 912, 914 with a single core, multiple processors 910, 912 with multiples cores, or any combination thereof.

The memory 930 comprises a main memory 932, a static memory 934, and a storage unit 936 accessible to the processors 910 via the bus 902, according to some embodiments. The storage unit 936 can include a machine-readable medium 938 on which are stored the instructions 916 embodying any one or more of the methodologies or functions described herein. The instructions 916 can also reside, completely or at least partially, within the main memory 932, within the static memory 934, within at least one of the processors 910 (e.g., within the processor's cache memory), or any suitable combination thereof, during execution thereof by the machine 900. Accordingly, in various embodiments, the main memory 932, the static memory 934, and the processors 910 are considered machine-readable media 938.

As used herein, the term "memory" refers to a machine-readable medium 938 able to store data temporarily or permanently and may be taken to include, but not be limited to, random-access memory (RAM), read-only memory (ROM), buffer memory, flash memory, and cache memory. While the machine-readable medium 938 is shown, in an example embodiment, to be a single medium, the term "machine-readable medium" should be taken to include a single medium or multiple media (e.g., a centralized or distributed database, or associated caches and servers) able to store the instructions 916. The term "machine-readable medium" shall also be taken to include any medium, or combination of multiple media, that is capable of storing instructions (e.g., instructions 916) for execution by a machine (e.g., machine 900), such that the instructions 916, when executed by one or more processors of the machine 900 (e.g., processors 910), cause the machine 900 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 950 include a wide variety of components to receive input, provide output, produce output, transmit information, exchange information, capture measurements, and so on. In general, it will be appreciated that the I/O components 950 can include many other components that are not shown in FIG. 9. The I/O components 950 are grouped according to functionality merely for simplifying the following discussion, and the grouping is in no way limiting. In various example embodiments, the I/O components 950 include output components 952 and input components 954. The output components 952 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 954 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 950 include biometric components 956, motion components 958, environmental components 960, or position components 962, among a wide array of other components. For example, the biometric components 956 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 958 include acceleration sensor components (e.g., accelerometer), gravitation sensor components, rotation sensor components (e.g., gyroscope), and so forth. The environmental components 960 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 962 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 950 may include communication components 964 operable to couple the machine 900 to a network 980 or devices 970 via a coupling 982 and a coupling 972, respectively. For example, the communication components 964 include a network interface component or another suitable device to interface with the network 980. In further examples, communication components 964 include wired communication components, wireless communication components, cellular communication components, near field communication (NFC) components, BLUETOOTH® components (e.g., BLUETOOTH® Low Energy), WI-FI® components, and other communication components to provide communication via other modalities. The devices 970 may be another machine 900 or any of a wide variety of peripheral devices (e.g., a peripheral device coupled via a Universal Serial Bus (USB)).

Moreover, in some embodiments, the communication components 964 detect identifiers or include components operable to detect identifiers. For example, the communication components 964 include radio frequency identification (RFID) tag reader components, NFC smart tag detection components, optical reader components (e.g., an optical sensor to detect a one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 964, such as location via Internet Protocol (IP) geo-location, location via WI-FI® signal triangulation, location via detecting a BLUETOOTH® or NFC beacon signal that may indicate a particular location, and so forth.

In various example embodiments, one or more portions of the network 980 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a WI-FI® network, another type of network, or a combination of two or more such networks. For example, the network 980 or a portion of the network 980 may include a wireless or cellular network, and the coupling 982 may be a Code Division Multiple Access (CDMA) connection, a Global System for Mobile communications (GSM) connection, or another type of cellular or wireless coupling. In this example, the coupling 982 can implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 916 are transmitted or received over the network 980 using a transmission medium via a network interface device (e.g., a network interface component included in the communication components 964) and utilizing any one of a number of well-known transfer protocols (e.g., Hypertext Transfer Protocol (HTTP)). Similarly, in other example embodiments, the instructions 916 are transmitted or received using a transmission medium via the coupling 972 (e.g., a peer-to-peer coupling) to the devices 970. The term "transmission medium" shall be taken to include any intangible medium that is capable of storing, encoding, or carrying the instructions 916 for execution by the machine 900, and includes digital or analog communications signals or other intangible media to facilitate communication of such software.

Furthermore, the machine-readable medium 938 is non-transitory (in other words, not having any transitory signals) in that it does not embody a propagating signal. However, labeling the machine-readable medium 938 "non-transitory" should not be construed to mean that the medium is incapable of movement; the medium 938 should be considered as being transportable from one physical location to another. Additionally, since the machine-readable medium 938 is tangible, the medium 938 may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:

receiving, at a server computer, from one or more server computers associated with one or more cellular network operators, cellular network data including a plurality of device identifiers, and geographic coordinates and time information of one or more border crossing by the plurality of device identifiers between a plurality of cells in a cellular network;

for each device identifier of the plurality of device identifiers, determining, by the server computer, a speed of movement of a device associated with each device identifier of the plurality of device identifiers based on the geographic coordinates and time information of one or more border crossing by the plurality of device identifiers between the plurality of cells in the cellular network;

determining, by the server computer, based on the speed of movement of each device associated with each device identifier of the plurality of device identifiers, that a movement transition for one or more devices associated with one or more device identifiers has occurred between a first movement category of driving and a second movement category of walking, or a first movement category of walking and a second movement category of driving;

determining, by the server computer, whether a location of the movement transition for each of the one or more devices associated with the one or more device identifiers is near one or more parking spaces;

determining, by the server computer, that one or more parking spaces is vacant based on a movement transition of one or more devices associated with the one or more identifiers near the one or more parking spaces occurring between a first movement category of walking and a second movement category of driving;

determining, by the server computer, that one or more parking spaces is occupied based on a movement transition of one or more devices associated with the one or more identifiers near the one or more parking spaces occurring between a first movement category of driving and a second movement category of walking;

storing, by the server computer, data indicating a status of vacant or occupied for the one or more parking spaces;

receiving, by the server computer, a request from a third party server for parking data associated with a specified location; and sending, by the server computer, the parking data including the status of vacant or occupied for one or more parking spaces for the specified location to the third party server.

2. The method of claim 1, wherein the cellular network data includes data from active devices and idle devices.

3. The method of claim 1, further comprising:
determining the location of the movement transition for each of the one or more devices.

4. The method of claim 1, wherein the request for parking data is a request for a heat map of probability to find street parking in the specified location, and wherein sending the parking data includes:
calculating at least one probability of street parking on at least one street segment within the specified location;
sending the at least one street segment, the at least one probability of street parking on the at least one street segment, and a probability time stamp; and
wherein the at least one probability is shown in the heat map of probability to find street parking in the specified location.

5. The method of claim 1, wherein the request for parking data is a request for an estimated time to park and wherein sending parking data includes:
calculating an estimated time to park within the specified location; and
sending the estimated time to park.

6. The method of claim 1, wherein the cellular network data further comprises a timestamp for the reception of the cellular network data.

7. The method of claim 1, further comprising:
determining a direction of movement of a device associated with each device identifier of the plurality of identifiers based on the geographic coordinates and time information of the one or more border crossing by the plurality of device identifiers between the plurality of cells in the cellular network; and
wherein determining that a movement transition has occurred is further based on the direction of movement.

8. The method of claim 1, wherein determining that a movement transition has occurred is also based on movement data for other devices associated with the plurality of device identifiers.

9. The method of claim 1, further comprising:
receiving geographical data comprising at least one of street layouts, driving direction, and allowed parking and regulations;
storing the geographical data; and
wherein determining that a movement transition has occurred is further based on the geographical data.

10. A server computer comprising:
a processor;
a communication interface; and
a computer readable medium coupled with the processor, the computer readable medium comprising instructions stored thereon that are executable by the processor to cause a computing device to perform operations comprising:
receiving, from one or more server computers associated with one or more cellular network operators, cellular network data including a plurality of device identifiers, and geographic coordinates and time information of one or more border crossing by the plurality of device identifiers between a plurality of cells in a cellular network;

for each device identifier of the plurality of device identifiers, determining a speed of movement of a device associated with each device identifier of the plurality of device identifiers based on the geographic coordinates and time information of one or more border crossing by the plurality of device identifiers between the plurality of cells in the cellular network;

determining, based on the speed of movement of each device associated with each device identifier of the plurality of device identifiers, that a movement transition for one or more devices associated with one or more device identifiers has occurred between a first movement category of driving and a second movement category of walking, or a first movement category of walking and a second movement category of driving;

determining whether a location of the movement transition for each of the one or more devices associated with the one or more device identifiers is near one or more parking spaces;

determining that one or more parking spaces is vacant based on a movement transition of one or more devices associated with the one or more identifiers near the one or more parking spaces occurring between a first movement category of walking and a second movement category of driving;

determining that one or more parking spaces is occupied based on a movement transition of one or more devices associated with the one or more identifiers near the one or more parking spaces occurring between a first movement category of driving and a second movement category of walking;

storing data indicating a status of vacant or occupied for the one or more parking spaces;

receiving a request from a third party server for parking data associated with a specified location; and sending the parking data including the status of vacant or occupied for one or more parking spaces for the specified location to the third party server.

11. The server computer of claim 10, wherein the cellular network data includes data from active devices and idle devices.

12. The server computer of claim 10, the operations further comprising:
determining the location of the movement transition for each of the one or more devices.

13. The server computer of claim 10, wherein the request for parking data is a request for a heat map of probability to find street parking in the specified location, and wherein the operations further comprise:
calculating at least one probability of street parking on at least one street segment within the specified location; and
sending the at least one street segment, the at least one probability of street parking on the at least one street segment, and a probability time stamp.

14. The server computer of claim 10, wherein the request for parking data is a request for an estimated time to park and wherein the operations further comprise:
calculating an estimated time to park within the specified location; and
sending the estimated time to park.

15. The server computer of claim 10, wherein the cellular network data further includes a timestamp for the reception of the cellular network data.

16. The server computer of claim 10, the operations further comprising:
   determining a direction of movement of a device associated with each device identifier of the plurality of identifiers based on the geographic coordinates and time information of the one or more border crossing by the plurality of device identifiers between the plurality of cells in the cellular network; and
   wherein determining that a movement transition has occurred is further based on the direction of movement.

17. A non-transitory computer readable medium comprising instructions stored thereon that are executable by at least one processor to cause a computing device to perform operations comprising:
   receiving, from one or more server computers associated with one or more cellular network operators, cellular network data including a plurality of device identifiers, and geographic coordinates and time information of one or more border crossing by the plurality of device identifiers between a plurality of cells in a cellular network;
   for each device identifier of the plurality of device identifiers, determining a speed of movement of a device associated with each device identifier of the plurality of device identifiers based on the geographic coordinates and time information of one or more border crossing by the plurality of device identifiers between the plurality of cells in the cellular network;
   determining, based on the speed of movement of each device associated with each device identifier of the plurality of device identifiers, that a movement transition for one or more devices associated with one or more device identifiers has occurred between a first movement category of driving and a second movement category of walking, or a first movement category of walking and a second movement category of driving;
   determining whether a location of the movement transition for each of the one or more devices associated with the one or more device identifiers is near one or more parking spaces;
   determining that one or more parking spaces is vacant based on a movement transition of one or more devices associated with the one or more identifiers near the one or more parking spaces occurring between a first movement category of walking and a second movement category of driving;
   determining that one or more parking spaces is occupied based on a movement transition of one or more devices associated with the one or more identifiers near the one or more parking spaces occurring between a first movement category of driving and a second movement category of walking;
   storing data indicating a status of vacant or occupied for the one or more parking spaces;
   receiving a request from a third party server for parking data associated with a specified location; and
   sending the parking data including the status of vacant or occupied for one or more parking spaces for the specified location to the third party server.

18. The method of claim 1, further comprising:
   determining that the request for parking data associated with a specified location is a request for a best route to find parking; and
   sending, to the third party server, the parking data including a route to find a parking location within the specified location.

19. The method of claim 1, further comprising:
   verifying that the movement transition occurred between the first movement category and the second movement category based on movement data of other devices in a similar location to the first device.

20. The method of claim 1, wherein determining, based on the speed of movement of the first device, that a movement transition has occurred between the first movement category and the second movement category, is based on a change in speed associated with the device.

* * * * *